H. M. LAMBERT.
METHOD OF MANUFACTURING CUSHION TIRES.
APPLICATION FILED MAY 4, 1921.

1,429,512.

Patented Sept. 19, 1922.
3 SHEETS—SHEET 1.

INVENTOR
H. M. Lambert
BY
ATTORNEYS

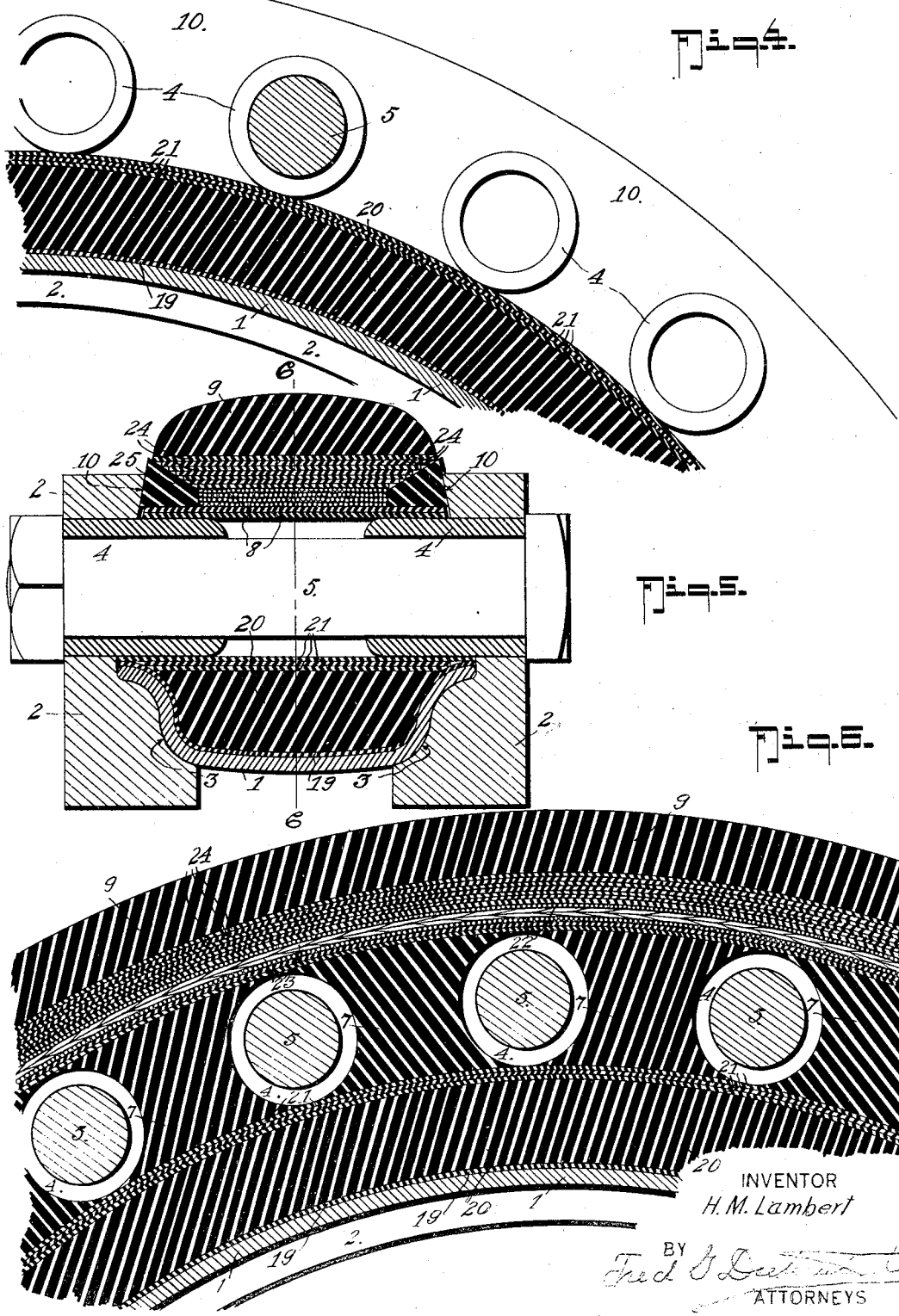

H. M. LAMBERT.
METHOD OF MANUFACTURING CUSHION TIRES.
APPLICATION FILED MAY 4, 1921.
1,429,512.
Patented Sept. 19, 1922.
3 SHEETS—SHEET 3.
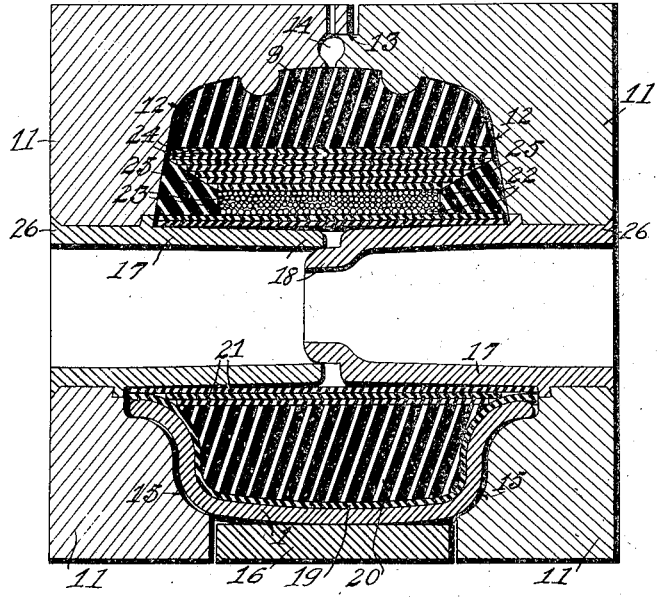
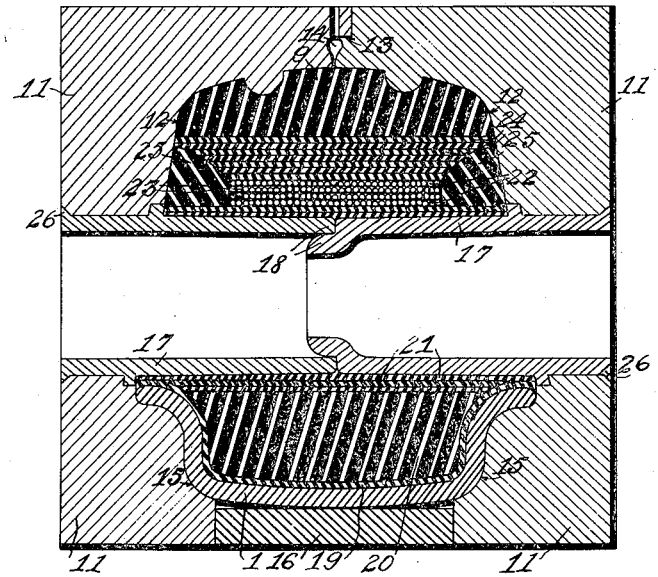
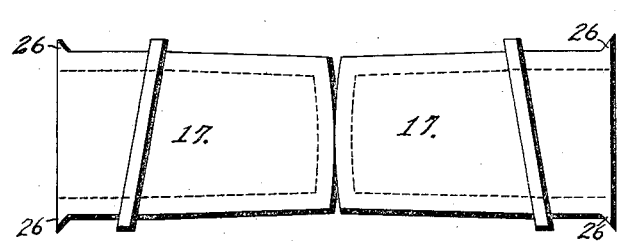
INVENTOR
*H. M. Lambert*
BY
*Fred G. Dieterich*
ATTORNEYS Patented Sept. 19, 1922.

1,429,512

UNITED STATES PATENT OFFICE.

HENRY M. LAMBERT, OF PORTLAND, OREGON, ASSIGNOR TO LAMBERT TIRE AND RUBBER COMPANY, OF PORTLAND, OREGON, A CORPORATION OF ARIZONA.

METHOD OF MANUFACTURING CUSHION TIRES.

Application filed May 4, 1921. Serial No. 466,812.

*To all whom it may concern:*

Be it known that I, HENRY M. LAMBERT, a citizen of the United States, residing at Portland, in the county of Multnomah and State of Oregon, have invented a new and Improved Method of Manufacturing Cushion Tires, of which the following is a specification.

My invention is a new method of manufacturing cushion tires of that type employing endless belts with interposed cushioning blocks or slabs designed to leave holes through or into the tire carcass.

The invention has for an object to provide a method by the employment of which the building up of the tire carcass and its final curing may be effected in a practical and economical way to produce a tire of long life and good resiliency.
In the drawings:

Figure 4 is a detail vertical section on the line 4—4 on Figure 3.

Figure 5 is a view similar to Figure 3 showing the carcass completely built up.
Figure 6 is a detail vertical section similar to Figure 4 and taken on the line 6—6 of Figure 5.

Figure 7 is a cross section of the vulcanizing mold with the tire carcass of Figure 5 placed therein before closing the mold.

Figure 8 is a similar view with the mold closed and showing how the lugs tend to expand the material radially at the holes, while the side plates compact the mass laterally.
Figure 9 is a detail view of the modified construction of lugs or pins used on the vulcanizing molds.

Figure 1:
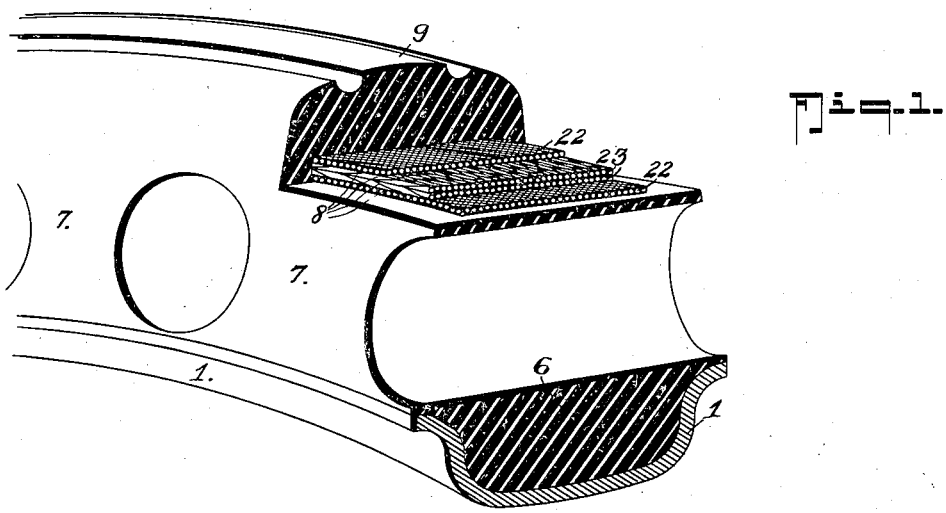
Figure 1 is a perspective view of a portion of a completed tire embodying the invention, parts being cut away to show the structure.
Figure 2:
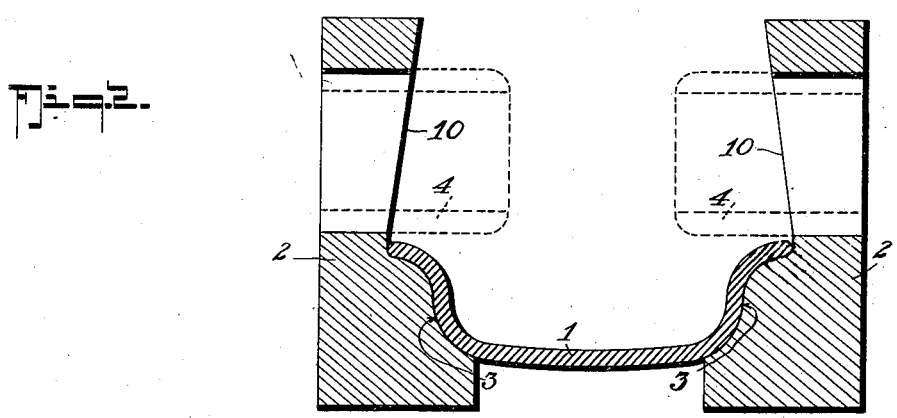
Figure 2 is a cross section of a form, with rim in place, on which the tire carcass is to be built up.
Figure 3:
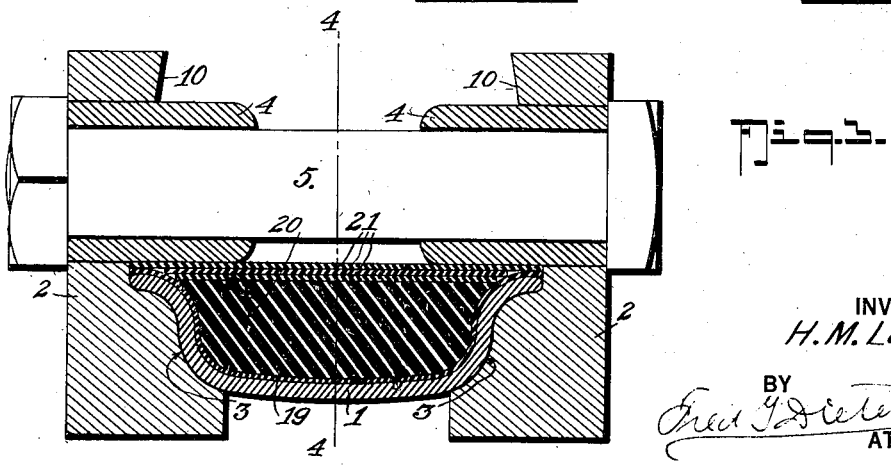
Figure 3 is a view similar to Figure 2, the base layer and belt being shown in place ready to receive the cushioning blocks.

In the drawings in which like numerals and letters of reference designate like parts in all of the figures, 1 designates the rim on which the tire is to be built; the inner surface of the rim being plated with a metal having an affinity for rubber, such as brass for example.

In carrying out my method, I provide a pair of side plates 2—2 having portions 3 to receive the rim 1 and provided with short lugs 4, preferably tubular, to permit passage of bolts 5 which hold the side plates 2—2 in proper position and against lateral separation from the rim.

The lugs 4 do not project across the entire width of the rim but only a distance sufficient to act as spacers for the cushion blocks of the tire, later referred to.

After the rim 1 has been placed between the plates 2—2 and the plates positioned properly, with the lugs 4 of one plate opposing those of the other plate, the base structure 6 of the tire is built onto the rim, after which a series of blocks 7 of the shape indicated in Figure 6 are placed on the base layer and held spaced apart by the series of lugs 4.

The blocks 7 are of cushion gum and after having been placed in position, the outer belt structure 8 and tread part 9 of the tire is built up until a structure such as indicated in Figures 5 and 6 is produced.

The side plates 2 are arranged with their opposing faces 10 spaced a greater distance apart than the desired final width of the tire, the purpose of which will presently appear.

In building the tire on the rim 1, the belt structure 8 is wound snugly over the blocks 7.

The base structure 6 is preferably made up of a layer of rubber sheet 19 placed in contact with the plated face of the rim 1, a filler 20 of a poorer grade of rubber is then placed in the rim and on top of that one or more layers or bands of rubber 21 are placed to complete the base structure.

The belt structure 8 is preferably composed of layers of rubberized woven fabric and rubberized cord fabric 22—23, respectively, of a width less than that of the finished tire, and over the belt structure is placed one or more rubber strips or bands

24 followed by the tread rubber 9, wedge rings 25 of tough rubber being placed at each side of the belt structure before the bands 24 are applied.

After the tire has been built up between the plates 2—2, the plates are removed from the tire in any desired way and the tire is then placed in the vulcanizing mold, as shown in Figures 7 and 8.

The vulcanizing mold comprises side plates 11—11 which have their opposing faces 12 shaped to give the tire the final side and tread outline or form desired.

The side plates 11 of the mold are lapped joined where their medial edges meet, as at 13, and are preferably provided with the usual overflow grooves 14 into which excess rubber flows during the squeezing process.

The said plates are also formed at 15 to receive the rim 1 and are provided with a spacing ring 16.

17—17 designate opposing series of pins or lugs carried by the side plates 11 of the vulcanizing mold and these pins 17 are preferably tapered toward their ends so as to facilitate their entry or penetration in the holes of the tire, when the mold is placed on the tire carcass, that is formed between the plates 2—2.

The pins 17 also preferably have a male and female connection at 18, as best shown in Figure 8, though those of one side plate may simply abut those of the other side plate, as desired, as illustrated in the detail view, Figure 9.

It will also be noted by reference to Figure 8 that when the mold is closed, the final dimensions of the mold chamber will be less in width than the space between the plates 2—2 so that a lateral squeeze is imparted to the tire carcass as the mold closes and the pins 17 are preferably of a slightly greater diameter adjacent to the plates 11 than the diameter of the pins 4, so that, in forcing the mold sections 11—11 to the closed position, the pins 17 will have a tendency to expand the openings in the tire carcass and thus exert radial pressure in the openings at the same time the lateral compacting pressure of the mold plates 11—11 is being applied.

This has a tendency to not only compact the tire so as to apply a radial and transverse force to the belts 8, but also aids in holding the belts 8 in a taut condition, after the vulcanization is finished and the mold removed.

The mold members 11—11 may be squeezed together by placing them in a suitable press or they may be brought together in any well known way and held there.

When the mold is closed, the tire and mold are placed in a vulcanizing kettle and vulcanized in the usual way.

It is to be noted that the pins 17 are permanently fastened into the side plates 11 by riveting over the ends of the pins as indicated at 26, so that, when the plates 11 are pulled off from the tire carcass laterally, the pins 17 will be withdrawn also In this application I make no claim to the apparatus employed in assisting in carrying out my method as the apparatus forms the subject matter of a divisional application filed on the 22nd day of August, 1921, Serial No. 494,257, Patent 1,399,128.

From the foregoing description taken in connection with the accompanying drawings, it is thought that the method employed will be clearly understood by those skilled in the art to which the invention appertains.

What I claim is:

1. The method of manufacturing cushion tires which consists in building up a base layer on a suitable ring or rim, then placing cushion blocks at intervals radially on said base structure and subsequently building up over the cushion blocks a tread structure to form a tire carcass of greater cross sectional area than the finished product, then applying a constricting pressure to the outer surface of the carcass and simultaneously applying an expanding pressure in the holes between adjacent cushion blocks and vulcanizing the carcass while under pressure.

2. The method of manufacturing cushion tires which consists in taking a rim, building up a base structure on the rim, placing cushion blocks radially on the base structure while holding the same spaced apart to leave holes between adjacent cushion blocks, then while holding the blocks spaced apart, building an endless belt and tread structure over the cushion blocks whereby to produce a tire carcass of greater cross sectional area than that of the finished product, and finally compressing the carcass over its outer area and simultaneously applying expanding pressure in the holes between adjacent cushion blocks and vulcanizing the carcass while under such pressure.

3. The method of manufacturing cushion tires which consists in taking a channel member having a surface of a material possessing an affinity for rubber, placing a sheet of rubber material over said surface, filling said channel member with rubber composition to constitute a base structure; then placing on said base structure the rubber blocks of proper length and shape and holding the same spaced apart to leave holes between adjacent blocks, placing over said blocks a layer of rubber; placing over said last named layer of rubber a belt structure composed of rubberized woven fabric and cord fabric, said belt structure being of less width than the width of the tire being built, placing over said belt structure layers of rubber to complete the tread, inserting wedge rings of rubber at each side of the belt structure, then compressing the mass above the channel member and vulcanizing the same while under pressure.

4. The method of manufacturing cushion tires which consists in taking a channel member having a surface of a material possessing an affinity for rubber, placing a sheet of rubber material over said surface, filling said channel member with rubber composition to constitute a base structure; then placing on said base structure the rubber blocks of proper length and shape and holding the same spaced apart to leave holes between adjacent blocks, placing over said blocks a layer of rubber; placing over said last named layer of rubber a belt structure, said belt structure being of less width than the width of the tire being built, placing over said belt structure layers of rubber to complete the tread, inserting wedge rings of rubber at each side of the belt structure, then compressing the mass above the channel member and vulcanizing the same while under pressure.

5. The method of manufacturing cushion tires which consists in taking a channel member, filling said channel member with rubber composition to form a base, placing a series of blocks on said base and holding the same spaced apart, placing a sheet structure of rubber around said blocks, winding a fabric-cord belt around said last named rubber sheet structure, the width of said belt being less than the width of said rubber sheet structure, placing wedge rings of rubber at each side of said belt structure, placing a rubber structure around said belt structure and said wedge rings, then applying surface pressure to the mass to contract the volume of the same and vulcanizing the mass while so contracted under pressure.

6. In the method of manufacturing tires wherein a rubber body having transverse holes through the same is built up and surrounded by a belt and tread structure; the step of forming the belt structure which consists in winding rubberized fabric around the periphery of the mass, then winding a strip of rubberized cord fabric around the fabric layer and subsequently winding another fabric around the cord fabric, placing the tread rubber on the same, placing rubber wedge rings at each side of the belt structure and finally compressing the mass to force said wedge rings inwardly to fill the spaces, and vulcanizing the mass while under compression into an integral whole.

7. The method of making cushion tires which consists in taking a channel member having a surface possessing an affinity for rubber, building up a rubber filler structure in said channel member, placing rubber blocks on said filler member at intervals to leave holes through the tire when completed, building up an outer structure over said blocks by first placing rubber bands around the blocks, then placing layers of cord fabric around the rubber bands, placing rubber wedge strips at each side of said cord fabric and building upon said cord fabric and said rubber strips, a rubber tread structure and vulcanizing the whole into an integral mass.

8. The method of making cushion tires which consists in taking a channel member, building up a rubber filler structure in said channel member, placing rubber blocks on said filler structure at intervals to leave holes through the tire when completed, building up an outer structure over said blocks by placing rubber bands around the blocks, placing layers of cord fabric around the rubber bands and placing rubber wedge strips at each side of said cord fabric, and thereafter building upon said cord fabric and rubber strips a rubber tread structure, placing the mass under pressure and vulcanizing the same while under pressure.

9. The method of manufacturing cushion tires which consists in providing a channel member or rim, building up a rubber filler structure in said channel member, placing rubber blocks on said filler structure at intervals to leave holes in the tire when completed, building up an outer structure over said blocks by placing bands around the blocks, certain of said bands being of less width than the width of the finished tire, placing rubber wedge strips adjacent to the sides of the said lesser width bands, thereafter building up a tread structure upon the aforesaid structure, placing the mass under compression and vulcanizing the same while under compression.

HENRY M. LAMBERT.